May 8, 1962 H. MUELLER 3,033,373
FILTER CLOTH FASTENING MEANS
Filed July 1, 1959 2 Sheets-Sheet 1

INVENTOR
Hans Mueller.
BY Michael S. Stoker
Attorney

May 8, 1962 H. MUELLER 3,033,373
FILTER CLOTH FASTENING MEANS
Filed July 1, 1959 2 Sheets-Sheet 2

INVENTOR
Hans Mueller
BY
Michael S. Striker
Attorney

United States Patent Office 3,033,373
Patented May 8, 1962

3,033,373
FILTER CLOTH FASTENING MEANS
Hans Mueller, Im Allemendli, Erlenbach, Switzerland
Filed July 1, 1959, Ser. No. 824,303
Claims priority, application Switzerland July 24, 1958
2 Claims. (Cl. 210—344)

The present invention relates to filter cloth fastening means for a filtering apparatus and more particularly to a device for fastening a filter cloth on a support.

The object of this invention is to provide means whereby the filter cloth can be securely held onto a filter element.

Another object of this invention is the provision of fastening means for a filter cloth onto a filter element which will facilitate the exchange of the filter cloth and will provide an easy and secure fastening means thereto.

A further object of this invention is to provide fastening means for the outer edges of a filter cloth particularly for filter elements which are rotated during operation.

A still further object of this invention is the provision of fastening means for a filter cloth wherein the filter elements are located in spaced tiers.

Still another object of this invention is to provide means to securely keep the distance between filter elements arranged in tiers.

A further object is the provision of a filtering apparatus in which the filter elements can be rotated at high speed.

Yet another object of this invention is the provision of a fastening means for a filter cloth which is not only fluid tight but also secure during operation at high speeds and enables a quick change of the filter cloth at desired intervals.

While an arrangement of this type is of utility for all types of filter apparatus, it is of particular utility for a filter apparatus in which the filter elements, covered by a filter cloth, are rotated at high speeds. It will be understood that if the filter elements and the filter cloth on it are rotated at high speed considerable centrifugal forces act on the filter cloth at the edge of the support and that safe and fluid-tight securing means have to be provided for the filter cloth at this edge to fasten the filter cloth onto its support.

With the above objects in view, the present invention mainly consists of a filter apparatus which includes a support member having an annular edge, filter means including a filter cloth having an annular edge portion covering the annular edge of the support member, holding means for holding the annular edge portion on the annular edge, and tensioning means for urging the holding means against the edge of the filter cloth whereby the filter cloth is kept clamped between the holding means and the support member.

In a preferred embodiment of the present invention, a plurality of support members having an annular edge are spaced by spacing means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
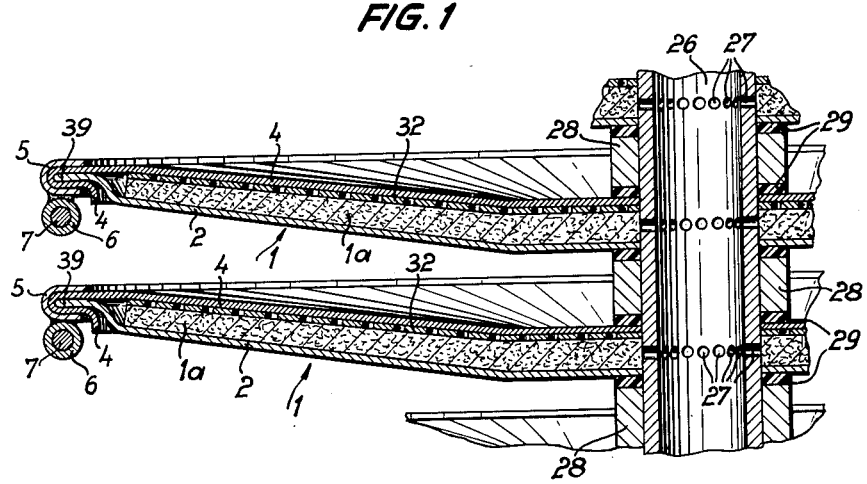
FIG. 1 is a sectional, elevational view of a filter apparatus according to the present invention.
Figure 2:
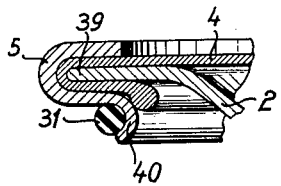
FIG. 2 is a sectional, fragmentary view showing the annular edge of a filter element.

Referring now to FIGS. 1 and 2, a hollow shaft 26 has formed in its wall suitable outlets 27. A series of filter elements 1 are carried by the shaft 26 for rotation therewith and communicate through the cutouts 27 with the interior of the shaft 26. In the illustrated embodiments, filter elements 1 are substantially flat and dish-shaped, but they may have any other suitable form. Flter material 1a is made of a material suitable for the particular filtration to be effected in the apparatus and ensures that the liquid can flow through the filter element 1 into the shaft through the cutouts 27 while the particles suspended in the liquid are retained in the exterior of the filter elements.

A plurality of sealing rings 29 are located between each pair of successive filter elements 1 together with spacing rings 28 so that the interior of the hollow shaft 26 can communicate only with the interior of the filter element 1. The sealing rings 29 are located on opposite sides of spacing rings 28 and respectively engage a pair of successive filter elements as shown in FIG. 1. Thus, the sealing rings 29 not only seal the hollow shaft 26, but in addition they serve, together with spacing rings 28, to space the filter elements at the desired distance from each other. The filter material 1a is supported on its underside by the dish-shaped filter support member 2. Above the filter material 1a is placed a dish-shaped perforated plate 32. Above perforated plate 32 is placed a filter cloth 4 having an annular edge portion surrounding the raised annular edge 39 of the support member 2 as is clearly shown in FIGS. 1 and 2. Mounted on the shaft and supported by it are not only the support member 2 and the filter material 1a, but also the perforated plate 32 and the filter cloth 4.

Figure 3:
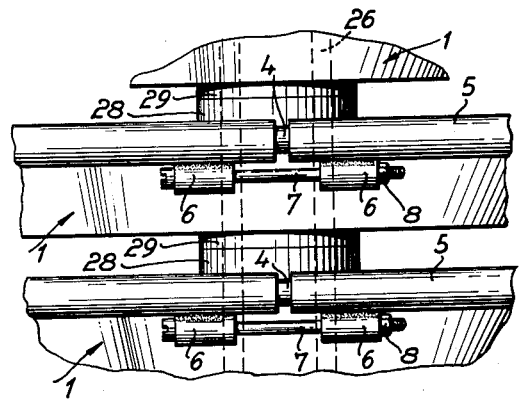
FIG. 3 is an elevational fragmentary view of the annular holding means on a filter apparatus according to the present invention.

The term "filter cloth" as used in the present application not only means a cloth made up of fibers but also a metallic sieve or the like, or a woven material made out of glass, metallic or synthetic threads. An annular holding means 5 surrounds the outer edge of the filter cloth which is bent over the annular edge 39 of the support member 2. Welded, or otherwise secured to the outer edges of the annular holding means are tubular members 6 as shown in FIG. 3. Tubular members 6 receive a bolt 7 passing through the bores of both members 6. A nut 8 which on threading onto bolt 7 will tighten the annular holding means 5 so as to tension the same and secure the annular edge portion of cloth 4 in a fluid-tight manner. The tensioning means 6, 7, 8 hold holding means 5 dismountable on support member 2 with cloth 4 securely held.

A modification of the tensioning means is shown in FIG. 2. The annular holding ring 5 is provided with a depending lip 40 forming a trough-like groove for the insertion of an endless elastic ring 31. Elastic ring 31 may conveniently be made of an elastic material such as rubber.

Figure 4:
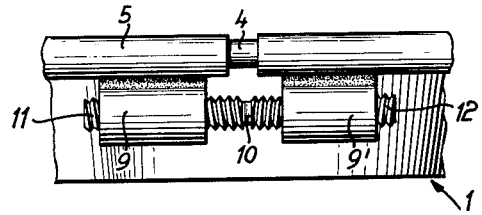
FIG. 4 is an elevational fragmentary view of a filter apparatus according to the present invention showing a modification of the tensioning means illustrated in FIG. 3.

Another modification of the tensioning means for the annular holding means is shown in FIG. 4. Here the members are provided with internal threads. Member 9 has a right-hand thread and member 9' has a left-hand thread. A bolt 10 having on one end a right-hand thread and on the other end a left-hand thread and having a flat square center portion for the insertion of a wrench, is threaded into members 9 and 9'. If the bolt 11 is now turned in one direction, members 9 and 9' will be forced together and the annular ring 5 will be suitably tensioned to securely hold the filter cloth 4 onto support member 2 and provide a fluid-tight seal thereon. Turning of bolt 10 in the other direction will force members 9 and 9' apart and allow removal of holding means 5.

Figure 5:
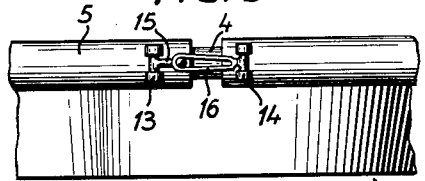
FIG. 5 is an elevational fragmentary view of a further modification of the tensioning means.
Figure 6:
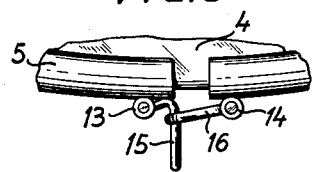
FIG. 6 is a plan view of the detail illustrated in FIG. 5.

A further modification of the tensioning means for holding means 5 is illustrated in FIGS. 5 and 6. Clip 14 is fixed on one end of ring 5 and serves as the pivot for the ring 16, while clip 13 held on the other end of holding means 5 carries a bell-crank lever. The end of the lever 15 passes through ring 16 and when lever 15 is turned to the left of FIG. 6, the means 5 will be suitably tensioned.

Figure 7:
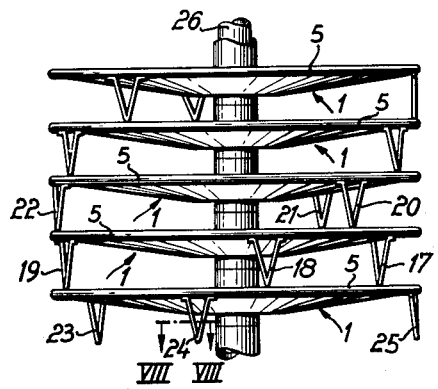
FIG. 7 is an elevational view of a filter apparatus according to the present invention particularly illustrating the spacing means for spacing the support members.

The filter element 1 will in some cases not have enough rigidity and will be subject to sagging, particularly if a viscous fluid is to be filtered. In order to provide spacing and support means for the filter elements circumferentially spaced spacing members 17–25 are welded or otherwise secured to the holding means 5, as illustrated in FIG. 7. A cross section through one spacing member is illustrated in FIG. 8, showing clearly the streamlined cross section of the spacing member in the direction of rotation of the filter elements.

Figure 9:
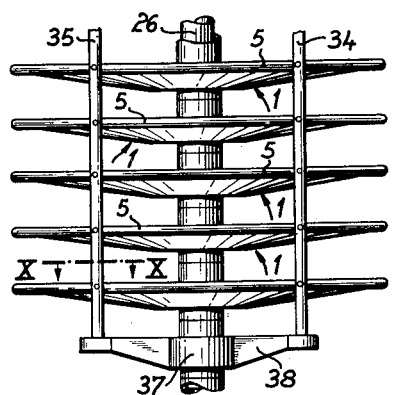
FIG. 9 is an elevational view of a filter apparatus according to the present invention illustrating a modification of the spacing means.
Figures 8, 10:
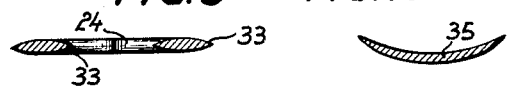
FIG. 8 is a sectional view of one of these spacing means taken along line 8—8 of FIG. 7.
FIG. 10 is a cross-sectional view of one of the spacing means taken along line 10—10 of FIG. 9.

A modification of the spacing means is illustrated in FIGS. 9 and 10. Here the spacing means comprise a number of rods 34, 35 supported by a support or annular web member 38 which in turn is supported at 37 onto shaft 26. A cross section of member 35 is shown in FIG. 10 indicating clearly the streamlined shape of rod 35 in the direction of rotation of the filter elements.

FIG. 7 does not show any support for the lowermost filter element. The construction according to FIG. 7 has a support similar to support 38 and fastened to shaft 26 similar to the construction illustrated in FIG. 9. It will also be noted that the spacing members 17–25 of FIG. 7 of different filter elements 1 are staggered in circumferential direction.

The cross section through the spacing member 24 shown in FIG. 8 is biconvex with sharp edges, and the spacing member 35 shown in FIG. 10 has one convex and one concave surface. It is to be understood that any other suitable cross-sectional configuration can be utilized to reduce the resistance of the liquid to be filtered.

It will be understood that each of the elements described above, or two or more together, may also find a useful application in other types of filter apparatus differing from the type described above.

While the invention has been illustrated and described as embodied in a filter cloth fastening means, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a filter apparatus, in combination, a plurality of support members mounted in vertically spaced superimposed relationship and having an outer annular edge; filter means including a filter cloth having an annular edge portion folded over the outer annular edge of each support member; holding means for holding said annular edge portion of each filter cloth on said outer annular edge of the respective support member; tensioning means for urging said holding means against the edge portion of the respective filter cloth, whereby said filter cloth is clamped between said holding means and said support member; and spacing means having a cross section bounded by two arcs extending substantially in direction of said annular edge and intersecting along edges substantially parallel to said holding means, said spacing means being secured to each holding means and abutting against the respective adjacent holding means for holding said holding means in said substantially vertically spaced superimposed relationship.

2. In a filter apparatus, in combination, a tubular support; a plurality of annular support members in vertically spaced relationship and having an outer annular edge and a central opening receiving said tubular support; annular filter means having a central opening receiving said tubular support and including a filter cloth having an outer annular edge portion covering the outer annular edge of each support member; an annular web member mounted on said tubular support; holding means for holding said outer annular edge portion of each filter cloth on said outer annular edge of the respective support member; tensioning means for urging said holding means against the outer edge portion of the respective filter cloth, whereby said filter cloth is clamped between said holding means and said support member; a plurality of spacing means having a cross section bounded by two arcs extending substantially in direction of said annular edge and intersecting along edges substantially parallel to said holding means, said spacing means being secured to each holding means, arranged in a vertically superimposed spaced relationship and having a lower portion, the said lower portion of the lowermost spaced spacing means resting on said web member.

References Cited in the file of this patent

UNITED STATES PATENTS

| 1,323,421 | Sweetland | Dec. 2, 1919 |
| 1,932,117 | O'Brien | Oct. 24, 1933 |
| 2,731,156 | Purmont | Jan. 17, 1956 |
| 2,737,300 | Kracklaver | Mar. 6, 1956 |
| 2,765,083 | Purmont | Oct. 2, 1956 |
| 2,772,000 | Hunziker | Nov. 27, 1956 |
| 2,863,561 | Just et al. | Dec. 9, 1958 |
| 2,902,164 | Dornauf | Sept. 1, 1959 |
| 2,946,447 | Welz | July 26, 1960 |

FOREIGN PATENTS

| 291,316 | Germany | Apr. 13, 1916 |